US009274878B2

(12) United States Patent  
Jensen

(10) Patent No.: US 9,274,878 B2
(45) Date of Patent: *Mar. 1, 2016

(54) FIELD CONTROL DEVICES HAVING PRE-DEFINED ERROR-STATES AND RELATED METHODS

(71) Applicant: Fisher Controls International LLC, Marshalltown, IA (US)

(72) Inventor: Kurtis Kevin Jensen, Marshalltown, IA (US)

(73) Assignee: FISHER CONTROLS INTERNATIONAL, LLC, Marshalltown, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/330,122

(22) Filed: Jul. 14, 2014

(65) Prior Publication Data

US 2014/0325255 A1   Oct. 30, 2014

Related U.S. Application Data

(63) Continuation of application No. 13/280,060, filed on Oct. 24, 2011, now Pat. No. 8,812,914.

(51) Int. Cl.
| | | |
|---|---|---|
| *G06F 11/00* | (2006.01) | |
| *G06F 11/07* | (2006.01) | |
| *G05B 19/042* | (2006.01) | |

(52) U.S. Cl.
CPC ........ *G06F 11/0793* (2013.01); *G05B 19/0425* (2013.01)

(58) Field of Classification Search
USPC ........................................................ 714/47.2
See application file for complete search history.

(56) References Cited

U.S. PATENT DOCUMENTS 5,983,858 A    11/1999  Hashimoto et al.
6,236,908 B1 *  5/2001  Cheng et al. ...................... 701/1
(Continued)

OTHER PUBLICATIONS

Kerberg et al., "Deterministic Downlink Transmission in WirelessHART Networks enabling Wireless Control Applications," IECON 2010—36th Annual Conference on IEEE INdustrial Electronics Society, IEEE, Nov. 7, 2010, pp. 2120-2125, XP031840373, ISBN: 978-1-4244-5225-5.

International Searching Authority, "International Search Report," issued in connection with International Patent Application No. PCT/US2012/060976, on Jan. 21, 2013 (4 pages).

(Continued)

*Primary Examiner* — Kamini Patel
(74) *Attorney, Agent, or Firm* — Hanley, Flight & Zimmerman, LLC

(57) ABSTRACT

Control apparatus having pre-defined error-states and related methods are described. An example non-transitory computer-readable medium disclosed herein comprises instructions that, when executed, cause a machine to analyze, via a controller coupled to a field device, a communication from a control system remotely located from the controller, the control system to operate the field control device during a non-error condition; detect an error condition while the field control device is communicatively coupled to and receives the communication from the control system; and override the communication between the control system and the controller to operate the field control device based on a pre-defined error-state instruction stored in the controller when the error condition is detected to cause the field control device to move to a first position for a first amount of time and subsequently move the field control device to a second position for a second amount of time, the first position being different than the second position.

27 Claims, 7 Drawing Sheets

(56) References Cited

U.S. PATENT DOCUMENTS

| | | | |
|---|---|---|---|
| 8,087,638 B2 | 1/2012 | Burlage et al. | |
| 8,572,155 B2 * | 10/2013 | Yanovich et al. | 709/201 |
| 8,725,312 B2 * | 5/2014 | Mori et al. | 701/1 |
| 8,812,914 B2 * | 8/2014 | Jensen | 714/47.2 |
| 2009/0019146 A1 * | 1/2009 | Tegnell et al. | 709/224 |
| 2009/0088874 A1 | 4/2009 | Arceo et al. | |
| 2010/0025603 A1 | 2/2010 | Burlage et al. | |
| 2010/0073185 A1 | 3/2010 | Uchiyama et al. | |
| 2011/0048556 A1 | 3/2011 | Carter et al. | |
| 2011/0100325 A1 | 5/2011 | Wu | |
| 2011/0106321 A1 | 5/2011 | Cherian et al. | |
| 2011/0262007 A1 | 10/2011 | Kojima et al. | |
| 2013/0042476 A1 | 2/2013 | Carter et al. | |

OTHER PUBLICATIONS

International Searching Authority, "Written Opinion," issued in connection with International Patent Application No. PCT/US2012/060976, on Jan. 21, 2013 (7 pages).

United States Patent and Trademark Office, "Non-Final Office Action," issued in connection with U.S. Appl. No. 13/280,060, on Sep. 10, 2013 (21 pages).

United States Patent and Trademark Office, "Final Rejection," issued in connection with U.S. Appl. No. 13/280,060, on Feb. 4, 2014 (17 pages).

United States Patent and Trademark Office, "Notice of Allowance," issued in connection with U.S. Appl. No. 13/280,060, on Apr. 14, 2014 (5 pages).

* cited by examiner

FIELD CONTROL DEVICES HAVING PRE-DEFINED ERROR-STATES AND RELATED METHODS

RELATED APPLICATION

This patent arises from a continuation of U.S. patent application Ser. No. 13/280,060 (Now U.S. Pat. No. 8,812,914), filed on Oct. 24, 2011, entitled FIELD CONTROL DEVICES HAVING PRE-DEFINED ERROR STATES AND RELATED METHODS, which is hereby incorporated herein by reference in its entirety.

FIELD OF THE DISCLOSURE

This patent relates to field control apparatus and, more specifically, to field control devices having pre-defined error-states and related methods.

BACKGROUND

Process control systems use a variety of field devices to control and/or monitor process parameters. Field devices, such as valves, typically have associated instruments, such as a valve position controller and/or a position transmitter, that control a position of the field device and/or transmit information about the field device to implement one or more desired process(es) and/or operation(s) within a process plant. An example valve assembly includes a diaphragm-type pneumatic actuator, which is controlled by an electro-pneumatic valve position controller. The valve position controller receives, for example, a control signal from a control unit or system (e.g., a control room system) and converts the control signal(s) into one or more pneumatic pressures that are provided to the pneumatic actuator to open, close or hold a position of a corresponding field device or valve. However, in some instances, the process system may experience an error or fail condition that may affect the accuracy and reliability of the valve. For example, communication between the controller and the control system may be interrupted or stalled. In such instances, the controller cannot receive a signal from the control system, thereby causing the flow control device to remain in its last position or condition.

SUMMARY

An example method of operating a field control device described herein includes receiving, via a controller coupled to the field control device, a communication from a control system remotely located from the controller to operate the field control device during a non-error condition, detecting whether an error condition has occurred, and operating the field control device based on a pre-determined error-state instruction stored in the controller when the error condition is detected.

Another example method of operating a flow control system described herein includes monitoring an operating parameter of a process control system, detecting an error condition based on the operating parameter, and controlling a field control device via a local controller operatively coupled to the field control device based on at least one pre-determined error-state setting or instruction stored in the controller when the error condition is detected.

An example field control system described herein includes a fluid control device to control a fluid flow of a process fluid and a controller mounted to the field control device. The controller is operatively coupled to the field control device and is configured to receive a command from a system remotely located from the controller to control a position of the field control device. The controller has a local control system to command the field control device based on a pre-defined error-state setting stored in the local control system when an error condition is detected.

DETAILED DESCRIPTION

Figure 1:
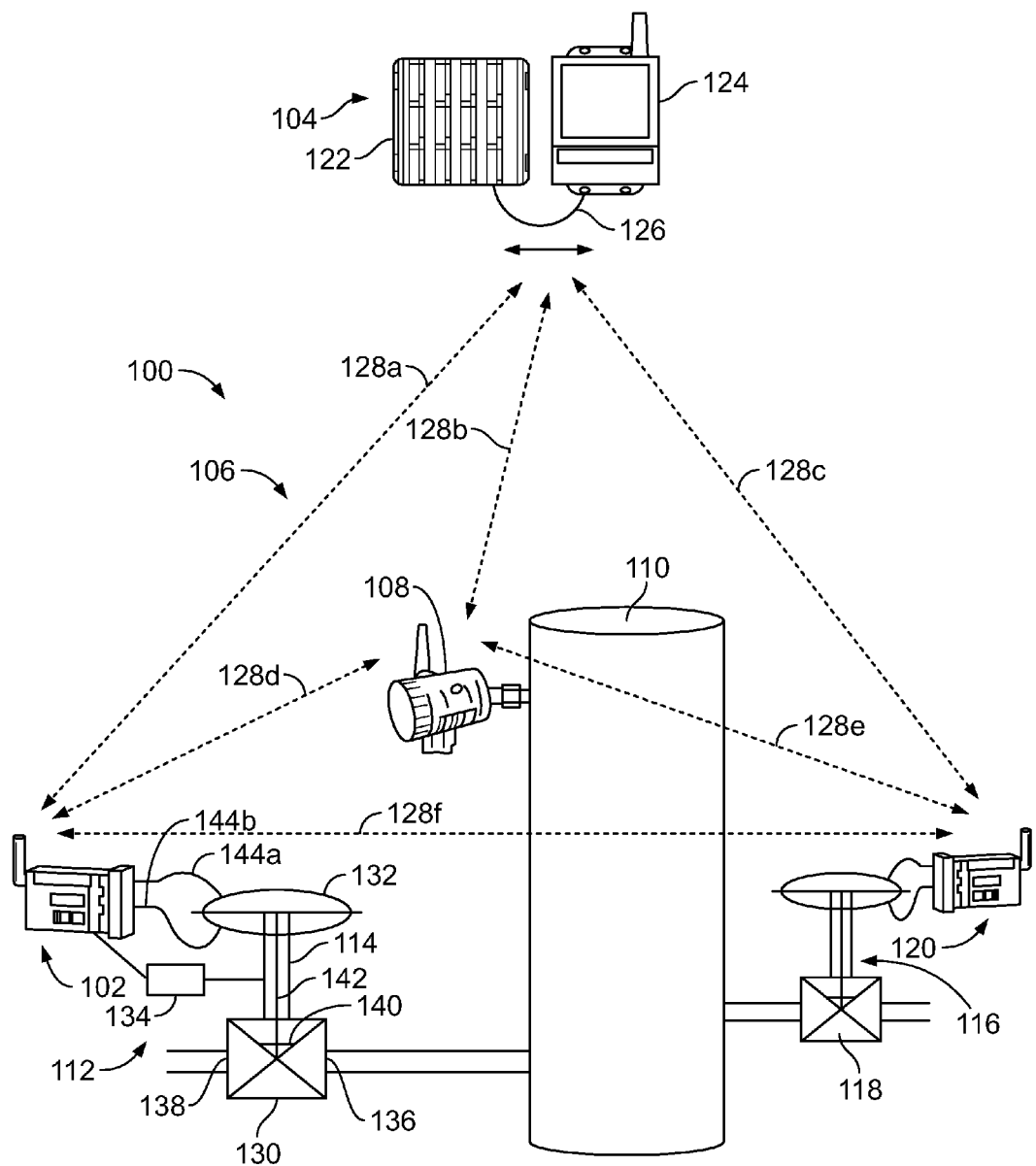
FIG. 1 depicts a process control system having an example controller apparatus described herein.

The example apparatus and related methods described herein enable a field control device or field device (e.g., a valve, a pump, a vent, a louver, a final control element, etc.) or, more generally, a final control element to operate based on a pre-defined error-state setting when an operating condition and/or parameter deviates from a non-error condition or non-fail condition (e.g., a normal operating condition). Deviation from a non-error condition may affect the functionality of the field device and/or may affect the ability to control the field device. As a result, if an error condition occurs, a field device may remain in its last current position, provided that a control fluid (e.g., air, hydraulic oil, etc.) to the field device is in a non-fail condition.

For example, one known field device (e.g., a valve) may be coupled to a controller (e.g., a valve positioner, a transceiver, a transducer, etc.) having a communication interface to receive a process control signal from a control system remotely located from the controller. In some instances, for example, when electric power to a control system is interrupted, communication between the control system and the communication interface of the controller may be lost. Without communication to the controller, the controller cannot receive a signal or instruction to control the field device. Thus, known field devices typically do not move to an error-safe condition when the controller detects an error-condition (e.g., communication between the controller and control system is interrupted).

Unlike known field devices, the example apparatus and related methods described herein enable control of a final control element or a field control device (e.g., a fluid control assembly) when an operating condition or parameter (e.g., a network connection status) deviates from a non-error condition. Example field devices, final control elements and/or fluid control apparatus may include, for example, a fluid or flow control valve, a pump, a vent, a louver, an actuator such as a pneumatic actuator, hydraulic actuator and/or any other field device(s) and/or final control element(s). Unlike known controller apparatus, the example controller apparatus and related methods described herein employ a local control process and/or logic circuitry to provide pre-defined error-state instructions or commands when an operating parameter and/or condition of a process control system and/or a field device deviates from a non-error condition.

For example, an example controller apparatus described herein may cause a field device to move to a pre-defined error-state condition when an error condition is detected. The pre-defined error-state condition(s) and/or instruction(s) or setting(s) may be user selected, user defined and/or programmable via, for example, an input interface of an example controller apparatus described herein. In some examples, an example controller apparatus described herein may prompt a user to select or activate one or more pre-defined error-state condition(s) or setting(s) from, for example, a table or list. As a result, a controller apparatus described herein can respond to an error condition even if a control system and/or other control apparatus of a process control system cannot communicate with the example controller apparatus described herein.

A user-defined or pre-defined error-state condition may correspond to detection of a communication interruption between a remotely situated control system (e.g., a control room or system) and the controller apparatus described herein. As a result, a local control system or logic circuit of the example controller apparatus described herein may control or operate a field device or flow control assembly based on a pre-defined error-state setting or instruction stored or configured in the example controller apparatus. For example, an error-state setting or instruction described herein may include moving a field device to an open position, a closed position, a throttling position, any position between a fully open or a fully closed position when, for example, a communication interruption is detected.

A user-defined error condition described herein may include detection of a temperature surrounding an example controller apparatus described herein that is greater than a temperature threshold value. In some examples, an error condition described herein may occur when a calibration value of the controller apparatus and/or field device deviates from a pre-set calibrated range. In other examples, an error condition described herein may occur when a measured position value of the field device does not correspond to a command position value provided to the example controller apparatus by a control system of a process system.

In some examples, a pre-defined error-state setting or instruction may include positioning a field device (e.g., a valve) to a position between a first or fully open position (e.g., 100 percent stroke) and a second or fully closed position (e.g., zero percent stroke). Additionally or alternatively, in some examples, a pre-defined error-state setting or instruction may include positioning the field device in a first position for a first duration or amount of time after detection of an error condition and positioning the field device in a second position for a second duration or amount of time after the expiration of the first duration if the error condition persists after expiration of the first duration. The first position may be different than the second position.

Additionally or alternatively, in some instances, the field device operation may be dependent on an operation and/or position of another field device in the process control system (e.g., an interlock process, a cascade process, etc.). In such instances, the example controller apparatus described herein may delay, ignore and/or override a control signal (e.g., a coordinated signal) provided by the control system when the other field device is not properly positioned when the controller apparatus receives the control signal. Additionally or alternatively, the controller apparatus may broadcast a warning or maintenance signal to the control system to alert a control room operator that the other field device is not properly positioned.

Additionally or alternatively, the example controller apparatus described herein may be used to detect or provide diagnostic information and an alert (e.g., a maintenance alert) when, for example, a valve does not move as expected, has stayed in a certain position for too long, maintenance has not been performed as expected, etc. In some examples, the controller apparatus described herein can initiate an automatic maintenance routine (e.g., to cycle the field device) based on a user-defined schedule (e.g., periodically operate a valve to prevent a flow control member of the valve from becoming stuck), etc.

FIG. 1 illustrates an example process control system 100 that includes an example controller apparatus or device 102 described herein having one or more pre-defined error-state condition(s) or instructions(s). As shown in FIG. 1, the example process control system 100 is communicatively coupled to a control system 104 (e.g., a control room system) via a communication network 106. In general, communication channels, links and paths that enable the controller apparatus 102 to function within the process control system 100 are commonly collectively referred to as the communication network 106. In the example of FIG. 1, the communication network 106 includes a wireless communication network. Although not shown, in other examples, the communication network 106 may be a hardwired communication system.

The example process control system 100 of FIG. 1 includes a field device or sensor 108 (e.g., a wireless transmitter or sensor) to monitor or sense a process parameter (e.g., a pressure, a fluid level, etc.) of a process fluid (e.g., liquid, gas, etc.) within a fluid containment apparatus or tank 110. To control fluid flow from the tank 110, the process control system 100 employs a field device 112 fluidly coupled to the tank 110. As shown in FIG. 1, the field device 112 of FIG. 1 includes a flow control apparatus or control valve 114 having the example controller apparatus 102 to control the operation of the flow control apparatus 114 as described in detail below. As shown in FIG. 1, the process control system 100 may include another or second field device 116 to control the flow of fluid into the tank 110. The second field device 116 may include a flow control apparatus or control valve 118 and another or second example controller apparatus 120 described herein to control the operation of the flow control apparatus 118.

The example communication network 106 of FIG. 1 communicatively couples the wireless field devices 108, 112 and 116 and a control system 122 (e.g., a host system, a controller, an alarm system, or other system) via at least one wireless interface 124 (e.g., a gateway). For example, the control system 122 may be in a control room remotely located from the field devices 108, 112 and 116. The wireless interface 124 is communicatively coupled to the control system 122 via a connection 126 such as, for example, an Ethernet connection, a Modbus Ethernet connection, a serial R485 connection and/or any other suitable connection(s). The wireless interface 124 may also support or make use of communication standards and protocols such as, for example, a local interface, a serial modbus, a remote interface, Modbus TCP/IP, HART or any other suitable communication standard(s) and/or protocol(s). Additionally, the wireless interface 124 may serve as a communication hub.

In some examples, the wireless field device 112 may be enabled to perform wireless communications with other enabled wireless field devices such as the wireless field device 108 or 116 and/or one or more wireless interfaces such as the wireless interface 124. Specifically, each of the wireless field devices 108, 112 and 116 may be configured to communicate via one or more wireless communication channels, paths or links 128a, 128b and 128c. Thus, each of the wireless field devices 108, 112 and 116 may communicate with the wireless interface 124 via multiple or redundant communication paths 128a-f.

Additionally, the field devices 108, 112 and/or 116 may be at nodes of a mesh network (e.g., a full or partial mesh topology) and, thus, may communicate simultaneously with other wireless enabled field devices and/or wireless interfaces (e.g., other gateways, routers or repeaters) within the process control system 100. In some examples, the wireless communication network 106, including the hardware and software associated therewith, provides point-to-point or direct communication paths that are selected during installation and fixed during subsequent operation of the system.

The example flow control apparatus 114 of FIG. 1 includes the valve 130, a pneumatic actuator 132 (e.g., a diaphragm or piston actuator) and a position sensor 134. The position sensor 134 may be, but not limited to, a non-contact sensor such as, for example, a linear array of Hall-effect sensors that output an analog signal having different values (e.g., voltages or currents) for different positions of a travel indicator coupled to a stem of the valve 130 and/or the actuator 132. Other example position sensors may include limit switches, contacts, and potentiometer-based position sensors. The example valve 130 of FIG. 1 provides an orifice (e.g., defined by a valve seat) and a fluid flow passageway between an inlet 136 and an outlet 138. The example actuator 132 of FIG. 1 is operatively coupled to a flow control member 140 via a valve stem 142, which moves the flow control member 140 in a first direction (e.g., away from an orifice) to allow a greater fluid flow between the inlet 136 and the outlet 138 and a second direction (e.g., toward an orifice) to restrict or prevent fluid flow between the inlet 136 and the outlet 138 based on a pressure differential provided across a sensing element of the actuator 132 via a control fluid (e.g., air). The flow control apparatus 114 employs the position sensor 134 to detect or sense the position of the flow control member 140 relative to the orifice. The position sensor 134 may be configured to generate a signal representative of the position of the valve 130.

In other examples, the controller apparatus 102 may be employed to control other types of actuators such as, for example, an electric, a hydraulic actuator, etc. For example, when operatively coupled to a hydraulic actuator, the controller apparatus 102 may provide electronic control signals to an electric actuator and/or may provide a signal representing a hydraulic control fluid pressure to be provided to a hydraulic actuator.

In operation, the field device or sensor 108 monitors a fluid level in the tank 110 and generates a signal representative of the fluid level in the tank 110. A transmitter of the field device 108 broadcasts or communicates the signal to the control system 122 and/or to the field devices 112 and 116 via the communication network 106. In addition, the field devices 112 and 116 may be configured to broadcast or communicate signals generated by the controller apparatus 102 and 120 corresponding to positions of the respective field devices 112 and 116 to the control system 122 via the communication network 106 and/or may also be configured to receive a command signal from the control system 122 via the communication network 106. For example, the controller apparatus 102 may receive a control signal from the control system 122 to move the valve 130 to a closed position to prevent fluid flow from the tank 110.

When the control system 122 receives a signal from the field device 108 corresponding to a fluid level in the tank 110 that is greater than a desired level, the control system 122 sends a control signal to the controller apparatus 102 to move the valve 130 to an open position to allow fluid to flow from the tank 110. For example, the controller apparatus 102 receives a control signal (e.g., a 4-20 milliamps (mA) control signal, a 0-10 volts direct current (VDC) control signal, a digital control signal, etc.) from the control system 122, and the controller apparatus 102 converts the control signal(s) into pneumatic or hydraulic pressures that are provided to the actuator 132 via passageways 144a and/or 144b to move the valve 130 to the open position. Alternatively, in other examples, the controller apparatus 102 may be configured to convert and/or send one or more electric signals to an electric actuator to move a valve to an open position. For example, if a process control routine of the control system 122 determines that the valve 130 is to permit the passage of a greater volume and/or rate of flow of a process fluid, the magnitude of the control signal supplied to the controller associated with the valve may be increased from 4 mA to 8 mA, assuming the use of a current type of control signal.

However, in operation, one or more operating parameters of the process control system 100 can deviate from a non-error condition (e.g., a normal operating condition). Deviation from a non-error condition may affect the functionality of a flow control assembly and/or may affect the ability to control the field device 112. As a result, for example, the valve 130 (e.g., the position of the flow control member 140 relative to the orifice) may remain in its last current position when an error-condition occurs (provided that the control fluid to the flow control assembly is in a non-fail condition).

For example, deviation from a non-error condition may occur when a communication between the control system 122 and the field devices 108, 112 and/or 116 is interrupted or stalled. For example, electric power to the control system 122 may fail or a control signal (e.g., provided by a point-to-point communication path) may be blocked or degraded and, thus, may not be able to effectively communicate with the field devices 108, 112 and/or 116, thereby reducing the accuracy and reliability of the process control system 100. In some examples, a temperature surrounding the controller apparatus 102 may elevate to a temperature greater than a suggested operating temperature. In some instances, a calibration range or value of the controller apparatus 102 and/or the position sensor 134 may deviate from a pre-set calibrated range or value.

As described in greater detail below, the controller apparatus 102 includes pre-defined error-state conditions or instructions that enable the controller apparatus 102 to control the field device 112 (e.g., the valve 130) when one or more of the operating parameters deviate from a non-error condition. For example, the controller apparatus 102 may include pre-defined error-state instructions (e.g., commands) that enable the controller apparatus 102 to move the flow control member 140 of the valve 130 to a pre-defined position based on the pre-defined error-state instruction(s) if communication between the control system 122 and the controller apparatus 102 is interrupted. In some examples, when an error-state condition is detected, the controller apparatus 102 can override a control signal provided by the control system 122 and instead operate the field device 112 based on the pre-defined error-state instruction(s) until the error condition is resolved.

Additionally or alternatively, an operational action of the field device 112 may be dependent upon a position of another field device of the process system 100 such as the second field device 116 of FIG. 1. More specifically, the example controller apparatus 102 described herein may be configured to receive a status signal from the controller apparatus 120 of the second field device 116, the operation of which precedes the operation of the field device 112. In that case, the controller apparatus 102 operates the field device 112 only if the second field device 116 is in a proper position. In some instances, the controller apparatus 102 may override a command signal (e.g., a coordinated signal) received from the control system 122 if the second field device 116 is not in a proper position.

For example, referring to the example of FIG. 1, the field device 108 may broadcast a signal to the control system 122 and/or the controller apparatus 102 and 120 that a fluid level in the tank 110 is at a desired level. A process control routine of the control system 122 may determine that the valves 130 and 118 are to move to a closed position in a coordinating manner and the control system 122 configures a coordinated control signal based on that determination and communicates that signal to the controller apparatus 102 and 120 to move each of the valves 130 and 118 to their closed positions. However, a pre-defined error-state instruction may cause the controller apparatus 102 to delay moving the valve 130 to the closed position if the controller apparatus 120 broadcasts a signal representative of the valve 118 being in a position other than the closed position. In this manner, if the controller apparatus 102 receives a signal from controller apparatus 120 indicating that the position of the valve 118 is not in the closed position, the controller apparatus 102 may not move the valve 130 to closed position because doing so may cause the fluid level in the tank 110 to rise, regardless of the control signal communicated by the control system 122.

In yet other examples, when an error condition occurs, the controller apparatus 102 may be configured to cause the valve 130 to move to a specific stroke position or intermediate position. For example, the specific stroke position may be between zero percent stroke and one-hundred percent stroke. For example, the controller apparatus 102 may cause the valve 130 to move a 10% stroke position (i.e., 10% open). In yet other examples, when an error-condition is detected, the controller apparatus 102 may be configured to move the valve 130 to a first position for a first duration or amount of time and a second position for a second duration or amount of time. For example, the controller apparatus 102 may cause the valve 130 to move to an 85% open position for a first hour after detection or occurrence of the error condition and may subsequently cause the valve 130 to move to a 15% open position after the first hour from detection or occurrence of the error condition. In yet other examples, when an error condition is detected, an error-state instruction may command the controller apparatus 102 to delay operating the field device 112 after a pre-set duration from the detection of the error condition lapses (e.g., one-hour from error condition detection).

Although the example of FIG. 1 illustrates the field device 112 as a valve 130, the example apparatus and methods described herein to pre-define fail state setting(s) may be used with other devices including, but not limited to, a final control element, a flow control device, a pump, a vent, a louver or any other device(s). Additionally or alternatively, while an example actuator 132 of FIG. 1 is depicted as a double-acting diaphragm or piston actuator, any other type(s) of actuator(s) such as, for example, a rotating actuator, a single-acting spring return diaphragm or piston actuator, an electric actuator, a hydraulic actuator, etc., may alternatively be used.

Figure 2:
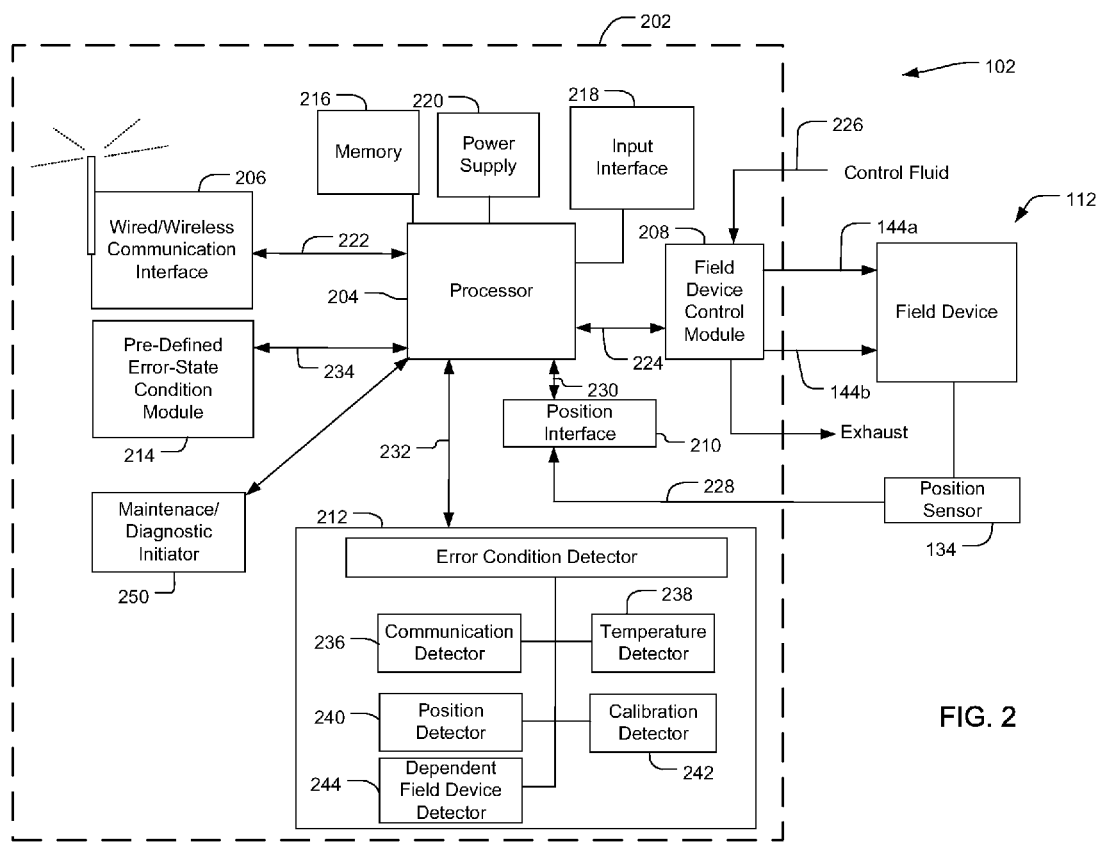
FIG. 2 is a schematic illustration of the example controller apparatus of FIG. 1.

FIG. 2 is block diaphragm of the example controller apparatus 102 of FIG. 1. In the illustrated example, the controller apparatus 102 is a wireless electro-pneumatic valve position controller 102 mounted to or, alternatively, disposed proximate to a field device such as, for example, the field device 112 of FIG. 1. The example valve position controller 102 described herein may be operatively coupled to the field device 112 to provide wireless valve position monitoring and pneumatic control of the field device 112. However, in other examples, the controller apparatus 102 may be a position transmitter, a transceiver, a transducer and/or any other controller for controlling a field device such as, for example, a final control element, an electric actuator, a hydraulic actuator, a pump, a vent, a louver etc.

Referring to FIGS. 1 and 2, the controller apparatus 102 includes a housing 202 to hold a processor 204, a communication interface 206, a field device control module and/or fluid device control module 208, a position interface 210, an error condition detector 212, a pre-defined error-state condition module 214, a memory 216, an input interface 218 and a power supply 220. The power supply 220 may receive alternating current, direct current or may be loop powered. Additionally or alternatively, the power supply 220 may include a self-contained power module (e.g., a battery pack). Thus, the controller apparatus 102 may be a self-powered controller.

To communicate with (e.g., send/receive information to) a control system or another field device such as the control system 122 and/or the field devices 108 and 116 of FIG. 1, the example controller apparatus 102 includes the communication interface 206. For example, the example controller apparatus 102 described herein may convey information (e.g., position information received from the position sensor 134 of the field device 112) to a control system (e.g., the control system 122 of FIG. 1) for processing. The control system 122 may then process the position information (e.g., to determine whether the valve should be opened/closed) and return appropriate commands to the processor 204 via the communication interface 206. The communication interface 206 provides the instructions to the processor 204 via a path or link 222. Thus, the example controller apparatus 102 is capable of collecting and relaying information and receiving information and/or commands from the control system 122 or other field devices 108 and 116 to directly control the field device 112 via the communication interface 206.

The processor 204 processes a control signal received from the communication interface 206 and communicates the signal to the field device control module 208 via a path or link 224, which controls pneumatic pressures supplied to the chambers of the actuator 132 by a control fluid 226 (e.g., pneumatic control fluid). For example, the processor 204 and/or the field device control module 208 may convert (e.g., via an I/P converter) an electronic command or signal (e.g., a voltage, a current, etc.) received by the communication interface 206 to generate a pneumatic signal (e.g., a proportional pressure signal) that may be used to control the field device 112 in accordance with the commands received by the communication interface 206 (e.g., instructions sent by the control system 122). Based on pressure control values provided by the processor 204, the field device control module 208 determines whether to increase or decrease the pneumatic pressures to be provided to the field device 112 via the fluid passageways 144a and 144b. For example, the field device control module 208 may include a valve or flow control apparatus to control the amount of control fluid 226 to flow to the passageways 144a and 144b. In some examples, the field device control module 208 may include a pneumatic amplifier to amplify the supply fluid signal. In other examples, as noted above, the controller apparatus 102 may be configured to control an electric actuator or other final control element. In such an example, the field device control module 208 may provide an electric signal or other instruction(s) or command(s) to a pump device to operate a pump, an electric actuator to move a valve coupled to the electric actuator, and/or any other final control element and/or flow control device(s)

As the field device 112 (e.g., the actuator 132) operates, the position interface 210 monitors a position of the field device 112. For example, the position interface 210 receives a feedback signal 228 from the position sensor 134 corresponding to the position of the field device 112 (e.g., the flow control member 140 of FIG. 1) based on the pressure differential provided to the actuator 132 of the field device 112 via the field device control module 208. The position interface 210 communicates the position information to the processor 204 via a link or path 230. In turn, the processor 204 processes the position information and the communication interface 206 broadcasts or communicates the position information to a communication network (e.g., the communication network 106 of FIG. 1).

Thus, when the process control system 100 of FIG. 1 is in a non-fail state or non-error condition, the processor 204 processes instructions received by the communication interface 206 to control the field device 112 and/or communicate status information of the field device 112 via the communication interface 206.

To detect if an error condition has occurred, the example controller apparatus 102 employs the error condition detector 212. An error condition is detected when a pre-defined process parameter of the field device 112, the controller apparatus 102 and/or other parameters or conditions of the process control system 100 of FIG. 1 deviate from a non-error condition. For example, when the error condition detector 212 detects an error condition has occurred, the error condition detector 212 communicates the detection of the error condition to the processor 204 via a path or link 232. In such instances, the processor 204 may not receive or process instructions provided by the communication interface 206. Instead of receiving or processing instructions received from the communication interface 206, the processor 204 processes and/or receives instructions provided by an alternative source to control or operate the field device 112. In the illustrated example, the alternative source is provided by the pre-defined error-state condition module 214. For example, when the error condition detector 212 detects an error condition, the pre-defined error-state condition module 214 provides control instructions to the processor 204 via a link 234. Additionally or alternatively, in some examples, the processor 204 may receive or process partial instructions from the communication interface 206 and partial instructions from the pre-defined error-state condition module 214 to control or operate the field device 112. In some examples, the processor 204 may receive a first pre-defined error-state instruction or command based on a first error condition detected and a second pre-defined error-state instruction or command based on a second error condition detected.

A pre-defined error-state instruction(s) or command(s) corresponding to an error condition may be programmable or configurable by a user. For example, a user may define a process parameter value or limit and the error condition detector detects whether the error condition has occurred when the process parameter value or limit is exceeded or deviates from the assigned, selected and/or configured non-error condition.

As shown in FIG. 2, the example error condition detector 212 includes a communication detector 236, a temperature detector 238, a position detector 240, a calibration detector 242 and a dependent field device detector 244.

The communication detector 236 detects a communication error with the communication network 106, the control system 122 and/or the field devices 108 and/or 116. For example, if the communication detector 236 detects a communication interruption in the link or path 222 between the communication interface 206 and the processor 204, then the communication detector 236 sends a signal to the processor 204 to receive a pre-defined error-state instruction from the pre-defined error-state condition module 214. In turn, the pre-defined error-state condition module 214 provides a pre-defined error-state instruction or command that corresponds to the detection of a communication error. For example, the pre-defined condition or instruction may command the processor 204 to operate the field device 112 to, for example, an open position, a closed position, a throttling position or any other position between the open and closed positions if a communication error is detected by the error condition detector 212. In some examples, another pre-defined error-state instruction may instruct the processor 204 to delay operating the fluid device 112 for a first period of time (e.g., begin operation one-hour after detection of an error condition). In some examples, the pre-defined error-state instruction may cause the processor 204 to control the field device 112 to a position (e.g., an open position) to allow draining the tank 110 for a specified amount of time without monitoring the actual fluid level in the tank 110.

The temperature detector 238 detects a temperature surrounding the controller apparatus 102. For example, the temperature detector 238 may receive a measured temperature value from a temperature sensor of the controller apparatus 102 and/or the process control system 100. The temperature detector 238 compares via, for example, a comparator the measured temperature value provided by the temperature sensor and a temperature threshold value that, for example, may be stored in the memory 216. As noted above, the temperature threshold value may be pre-defined or user selectable via the input interface 218. If the measured temperature value is greater than the temperature threshold value, the temperature detector 238 sends a signal to the processor 204. In turn, the pre-defined error-state condition module 214 provides the processor 204 with a pre-defined error-state instruction or command associated with detection of a temperature greater than the threshold value. For example, the pre-defined error instruction may command the processor 204 to power down. In some examples, the pre-defined error-state instruction may cause the processor 204 to move the field device to an open position or a closed position prior to powering down.

The position detector 240 determines if a position command signal provided to the processor 204 by the communication interface 206 and/or the pre-defined error-state condition module 214 correlates with a measured position value (e.g., the position signal 228) provided to the position interface 210 by the position sensor 134. For example, the position detector 240 may compare via, for example, a comparator the position command signal and the measured position value to determine if the field device 112 is in the proper position. If the position detector 240 determines that the measured position value does not correlate with the position command signal, the pre-defined error-state condition module 214 provides the processor 204 with a pre-defined error-state instruction or command associated with detection of an improper position of the field device 112. For example, the pre-defined error-state condition module 214 may send or broadcast a warning or maintenance signal to the communication network 106 via the communication interface 206. Additionally or alternatively, the example pre-defined error-state instruction may cause the processor 204 to initiate a maintenance routine to periodically or rapidly cycle the field device 112 to determine if the improper position may be due to a stuck valve.

The calibration detector 242 may be used to determine if a calibration between the controller apparatus 102 and the position sensor 134 deviates from a pre-set calibration range or value. If the calibration detector 242 detects a deviation from the pre-set calibration range or value, the pre-defined error-state condition module 214 provides the processor 204 with a pre-defined error-state instruction or command associated with detection of a deviation from the pre-set calibrated setting or range. For example, the pre-defined error-state condition module 214 may cause the processor 204 to initiate an automatic re-calibration routine and/or initiate a maintenance alert.

The dependent field device detector 244 detects if an operation of the field device 112 is dependent on an operation or action of another field device (e.g., the second field device 116 of FIG. 1) of the process control system 100. For example, in some instances, an operation of the second field device 116 may need to precede the operation and/or coordinate with the operation of the field device 112. If the dependent field device detector 244 determines that the operation of the field device 112 is dependent on the operation of the second field device 116 occurring first (or simultaneously), then the error condition detector 212 sends a signal to the processor 204 and/or the pre-defined error-state condition module 214. In turn, the pre-defined error-state condition module 214 provides the processor 204 with a pre-defined error-state instruction or command associated with detection of an operation of the field device 112 being dependent on the operation of the second field device 116. For example, during a maintenance process, the control system 122 may broadcast or communicate a signal to controller apparatus 102 and 120 to move the respective field devices 112 and 116 to a closed position (e.g., simultaneously). However, if the controller apparatus 120 of the second field device 116 broadcasts a signal indicating that the field device 116 is not in a closed position, the example dependent field device detector 244 sends a signal to the processor 204 and the dependent field device detector 244 determines that an error condition has occurred. In turn, a pre-defined error-state instruction may direct the processor 204 to delay, ignore, or override the command signal of the control system 122 until the dependent field device detector 244 determines that the second field device 116 is in a proper position.

As noted above, in the illustrated example, an error condition and/or a pre-defined error-state instruction or command may be user configurable or programmable. Some example pre-defined error-state instructions or commands may cause a field device such as, for example, the field device 112 to move to a fully open position, a fully closed position, a throttling position, and/or any other position between the fully open position and the fully closed position such as, for example, a 10% open position, a 80% open position, etc.

In some examples, the pre-defined error-state instruction may instruct the processor 204 to change or move the output or position of the field device 112 (e.g., from a closed position to an open position) for a period of time (e.g., 15 minutes, 5 hours, etc.), and then return to the previous output state or position (e.g., the closed position).

In yet other examples, the pre-defined error-state instructions may instruct the processor 204 to maintain a last current position of the field device 112 upon detection of an error condition by the error condition detector 212 (e.g., a fail-last position). In such instances, such a fail-last position may be provided without any pneumatic output. For example, the processor 204 may instruct the field device control module 208 to maintain the control fluid in the chambers of the actuator 132 such that the field device control module 208 does not exhaust the control fluid in the actuator 132 via an exhaust 246.

In some examples, pre-defined error-state instructions may command the processor 204 to move the field device 112 to any pre-selected position (e.g., a fail-set position) with or without the pneumatic output or use of the field device control module 208 and/or the control fluid 226. For example, for positioning the field device 112 without pneumatic output, the processor 204 may instruct the field device control module 208 to exhaust pressure from at least one of the chambers of the actuator 132 via the exhaust 246 to move the field device 112 to the fail-set position. For example, if a field device includes a single acting, spring loaded actuator, exhausting the control fluid from a control chamber of the actuator will cause the spring to move a flow control member of a valve to a fully open position or a fully closed position without the use of the control fluid 226.

Additionally or alternatively, the pre-defined error-state instruction may instruct the field device 112 to move to a first position for a first duration after the error condition detector 212 detects an error condition and may instruct the field device 112 to move to a second position for a second duration subsequent to the expiration of the first duration if the error condition detector 212 detects that the error condition is not resolved upon the expiration of the first duration.

An error condition(s) and/or a pre-defined error-state instruction may be programmable via the input interface 218. The input interface 218 may include a display (e.g., an LCD display, a touch-screen display, etc.) having an input module (e.g., a keypad, push buttons, etc.) to receive input information from, for example, a user or operator. In addition, the input interface 218 may include an override option (e.g., a button) to enable an operator or user to override commands or instructions provided by the communication interface 206 and/or the pre-defined error-state condition module 214. In such instances, the processor 204 may receive instructions or commands via the input interface 218.

The controller apparatus 102 of the illustrated example also includes the memory 216 to store pre-defined error-state commands or instructions. For example, if an error condition is detected by the error condition detector 212, the pre-defined error-state condition module 214 may retrieve from the memory 216 one or more pre-defined error-state instruction(s) that correlate to the detected error condition.

Additionally or alternatively, the example controller apparatus 102 may include a maintenance and/or diagnostic routine. A maintenance/diagnostic initiator 250 initiates a routine that may include initiating, for example, a warning or an alarm, a reminder. In some examples, the maintenance/diagnostic initiator 250 initiates a communication (e.g., instructions or commands) to the processor 204 when the maintenance/diagnostic initiator 250 detects that the field device 112 has not moved as commanded, has stayed in a certain position for a relatively long period of time, a maintenance schedule was missed or delayed, etc. In some instances, to prevent the field device 112 from becoming stuck due to inactivity, the example maintenance/diagnostic initiator 250 may periodically initiate an operation of the field device 112 (e.g., instructions to cycle the field device 112). A maintenance/diagnostic routine may be programmed to automatically initiate at any desired date, time, occurrence (e.g., reoccurring) etc. For example, an automated maintenance schedule may be stored in the controller apparatus 102 via the user input interface 218.

While an example manner of implementing the controller apparatus 102 of FIGS. 1 and 2 has been illustrated in FIG. 2, one or more of the elements, processes and/or devices illustrated in FIG. 2 may be combined, divided, re-arranged, omitted, eliminated and/or implemented in any other way. Further, the example pre-defined error-state condition module 214, the example error condition detector 212 and/or, more generally, the example the controller apparatus 102 of FIGS. 1 and 2 may be implemented by hardware, software, firmware and/or any combination of hardware, software and/or firmware. Thus, for example, any of the example pre-defined error-state condition module 214, the error condition detector 212, and/or, more generally, the example controller apparatus 120 of FIGS. 1 and 2 could be implemented by one or more circuit(s), programmable processor(s), application specific integrated circuit(s) (ASIC(s)), programmable logic device(s) (PLD(s)) and/or field programmable logic device(s) (FPLD(s)), etc. The example controller apparatus 102 may include one or more elements, processes and/or devices in addition to, or instead of, those illustrated in FIG. 2, and/or may include more than one of any or all of the illustrated elements, processes and devices.

Figure 3:
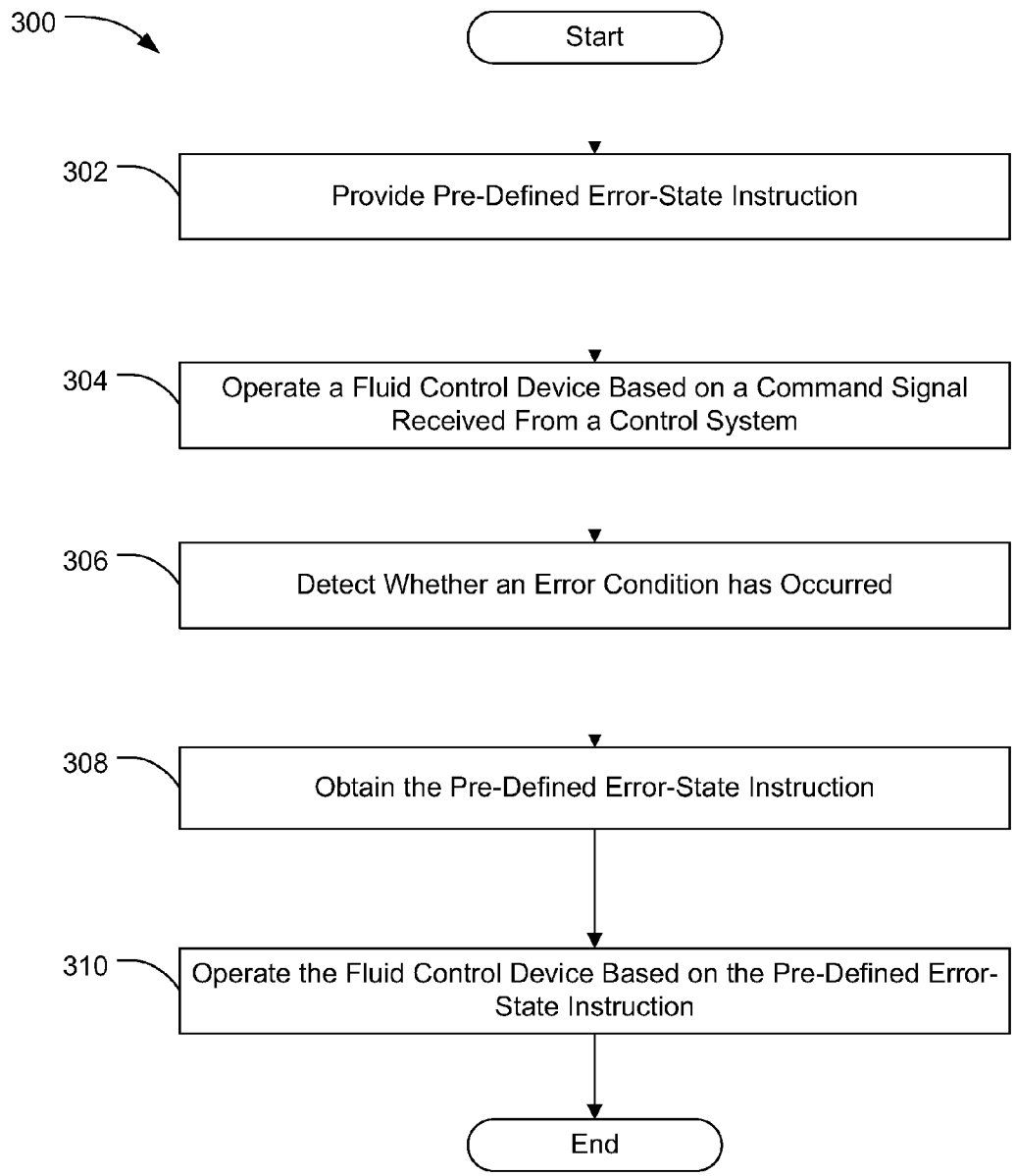
FIG. 3 is a flowchart representative of an example method that may be implemented with the example controller apparatus of FIGS. 1 and 2.
Figure 4:
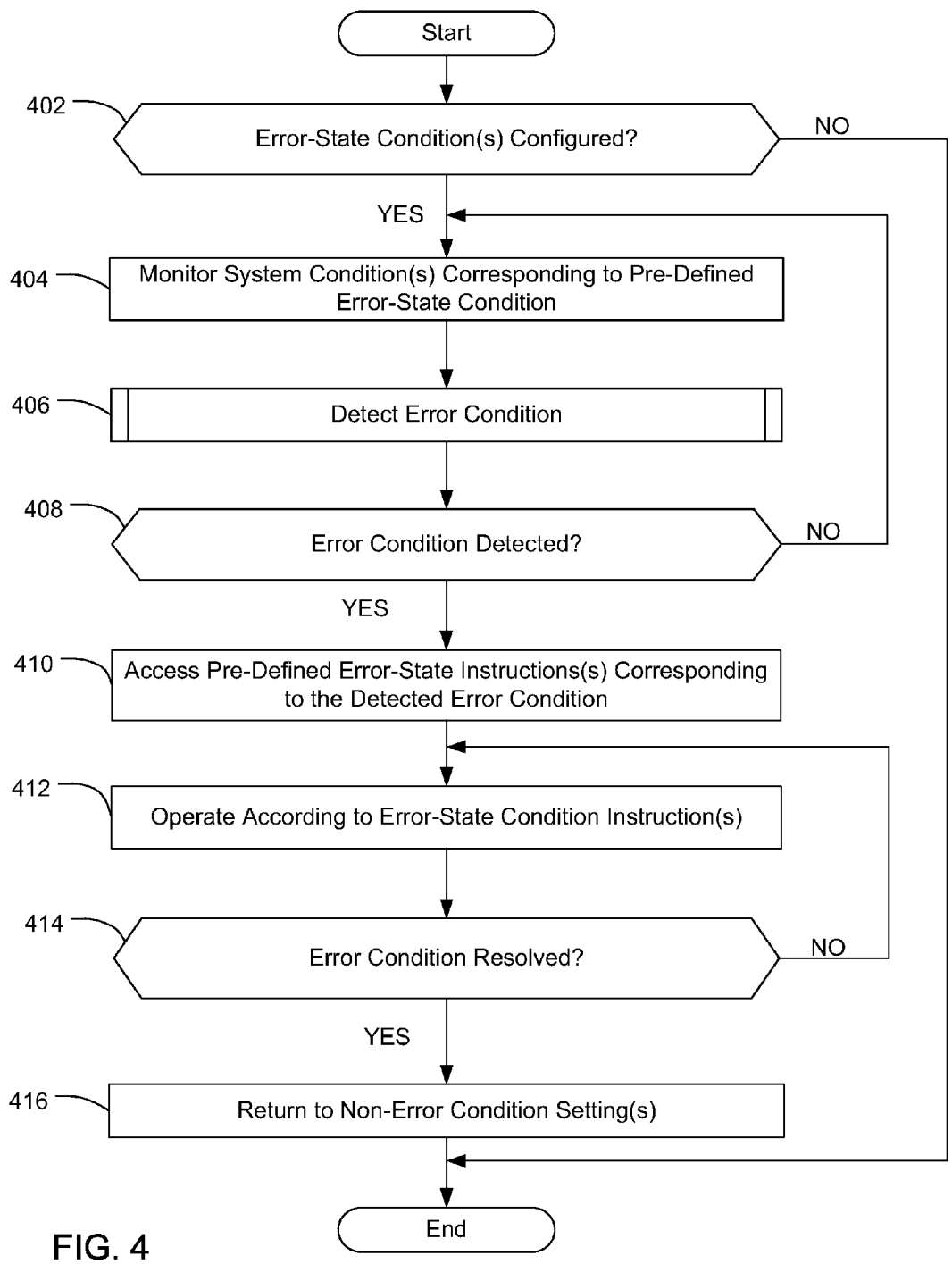
FIG. 4 is a flowchart representative of an example process that may be used to operate the example controller apparatus of FIGS. 1 and 2.
Figure 5:
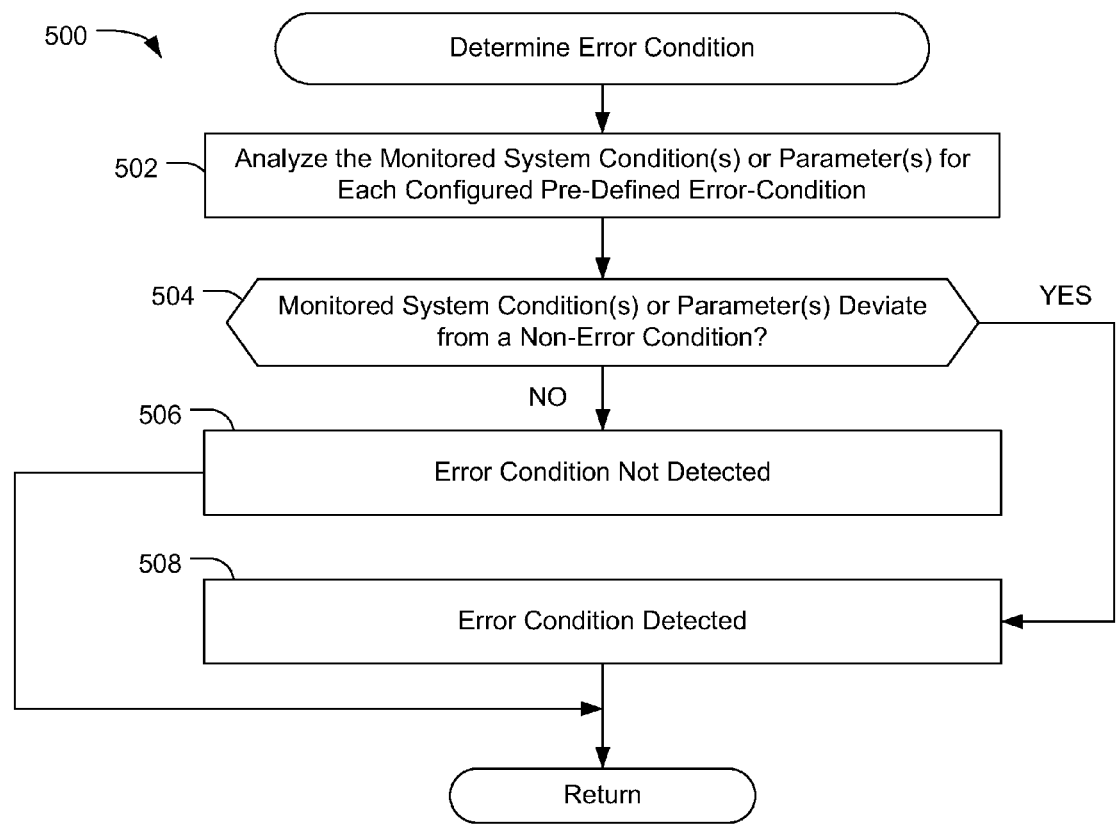
FIG. 5 is a flowchart representative of an example process of FIG. 4 to detect an error condition.

FIGS. 3-5 are flowcharts representative of example methods that may be used to control, operate and/or otherwise implement the example controller apparatus 102 of FIGS. 1 and 2. While example methods 300, 400 and 500 have been illustrated in FIGS. 3-5, one or more of the operations illustrated in FIGS. 3-5 may be combined, divided, re-arranged, omitted, eliminated and/or implemented in any other way. Further still, the example methods of FIGS. 3-5 may include one or more operations in addition to, or instead of, those illustrated in FIGS. 3-5, and/or may include more than one of any or all of the illustrated operations. Further, although the example method is described with reference to the flow chart illustrated in FIGS. 3-5, many other methods of detecting an error condition of a process control system may alternatively be used.

FIG. 3 is a flowchart representative of an example method that may be used to implement the example controller apparatus 102 of FIGS. 1 and 2.

Referring to FIG. 3, the controller apparatus 102 is provided with a pre-defined error-state instruction that corresponds to a detected error condition (block 302). For example, the pre-defined error-state instruction and/or the corresponding error condition may be programmable. For example, a pre-defined error-state instruction may be pre-installed (e.g., at the factory) in the controller apparatus 102 and/or may be provided to the controller apparatus 102 after installation of the controller apparatus 102 to the field device 112 (e.g., in the field). In some examples, the pre-defined error-state instruction and/or corresponding error condition may be user programmed instructions or commands that may be input to the controller apparatus 102 via the input interface 218 as described above.

During operation, the controller apparatus 102 operates the field device based on a command signal received from a control system (block 304). For example, if the controller apparatus 102 does not detect that an error condition has occurred, the processor 204 operates the field device 112 based on a control signal or instruction provided by the control system 122 via the communication interface 206.

Also, during operation, the controller apparatus 102 and/or the error condition detector 212 detects whether an error condition has occurred (block 306). For example, the error condition detector 212 monitors one or more process control system parameters or settings associated with an error condition stored in the controller apparatus 102. For example, the error condition detector 212 monitors communication via the communication detector 236, a temperature via the temperature detector 238, a field device position via the position detector 240, a calibration via the calibration detector 242 and/or an interlock process or cascade process via the dependent field device detector 244.

If an error condition is detected by, for example, the error condition detector 212, the controller apparatus 102 obtains or retrieves a pre-defined error-state instruction that corresponds to the error condition detected (block 308). For example, the processor 204 may retrieve or obtain the pre-defined error-state instruction from the pre-defined error-state condition module 214.

The controller apparatus 102 operates or controls the field device 112 based on the pre-defined error-state instruction (block 310). For example, the processor 204 may receive a pre-determined error-state instruction to move the field device 112 to a closed position upon detection of a communication error condition provided by the communication detector 236. The processor 204 may command the field device control module 208 to provide control fluid 226 to an upper chamber of the actuator 132 to move the flow control member 140 toward the orifice to restrict or prevent fluid flow through the passageway of the valve 130. In other examples, the pre-defined error-state instructions may command or operate a final control element such as, for example, an electrically actuated valve, a pump, a vent and/or any other suitable field device(s) or final control element(s). In some examples, the pre-defined error-state instructions may be high pressure signals used with hydraulic actuated valves or final control elements.

FIG. 4 is a flowchart representative of an example process to control the example controller apparatus 102 of FIGS. 1 and 2.

To detect an error condition, the example processor 204 and/or error condition detector 212 determine if an error condition and/or an error-state instruction is stored or otherwise configured in the controller apparatus 102 (block 402). For example, the processor 204 and/or the error condition detector 212 determine whether a pre-defined error-state condition has been stored in the memory 216 of the controller apparatus 102. If the pre-defined error-state condition has not been provided or defined, then the process 400 ends.

If the processor 204 and/or the error condition detector 212 determine that a pre-defined error-state condition is provided at block 402, then the processor 204 and/or the error control detector 212 monitor one or more system condition(s) and/or parameter(s) of the process control system 100 of FIG. 1 that correspond to the pre-defined error-state condition configured in the controller apparatus 102 (block 404). As mentioned above, an example system condition and/or parameter that can be configured includes, but is not limited to, a network communication, a temperature value, a calibration setting, a position value, coordinated operation of multiple field devices, and/or any other process control system condition(s) and/or parameter(s) that can be monitored.

The processor 204 and/or the error condition detector 212 then runs or executes an error condition detection process to detect an error condition (block 406). For example, the processor 204 and/or the error condition detector 212 may detect an error condition based on the monitored system conditions and/or parameters information received at block 404. An example error condition detection process 500 that may be used to implement block 406 is described in connection with FIG. 5.

If the processor 204 and/or the error condition detector determine that an error condition has not occurred at block 406, the process 400 returns to block 404 (block 408). For example, if an error condition is not detected at block 406, then the processor 204 continues to control or operate the field device 112 based on instructions received via the communication interface 206. If the error condition detector 212 detects an error condition, then the error condition detector 212 provides a signal to the processor 204 indicating that an error condition has occurred (block 408).

The processor 204 and/or the error condition detector 212 access, obtain, or receive the pre-defined error-state instructions corresponding to the detected error condition. (block 410). For example, the pre-defined error-state condition module 214 may retrieve from the memory 216 the pre-defined error-state instructions corresponding to the specific error condition detected at block 406, and/or may send or provide the pre-defined error-state instruction(s) to the processor 204. The processor 204 then operates the field device 112 according to the pre-defined error-state instruction(s) associated with the error condition detected at block 404 (block 412).

The processor 204 then determines if the detected error condition is resolved (block 414). If the detected error condition is not resolved at block 414, then the processor 204 continues to operate the field device 112 according to the pre-defined error-state instructions obtained at block 412. If the detected error condition is resolved, then the controller apparatus 102 returns to non-error condition settings (block 416). When the controller apparatus 102 returns to a non-error condition, the processor 204 controls the field device 112 via instructions received by the communication interface 204 (e.g., instructions provided by the control system 122).

FIG. 5 is a flowchart representative of an example error condition detection process that may implement the block 406 of FIG. 4.

To determine an error condition, the error condition detector 212 analyzes or processes the monitored system conditions and/or parameters obtained at block 404 of FIG. 4 (block 502). For example, the error condition detector 212 may analyze, measure and/or process the monitored system conditions and/or parameters for each of the pre-defined error condition configured in the controller apparatus 102.

The error condition detector 212 then determines if the monitored system condition(s) and/or parameter(s) deviate from a non-error condition (block 504). If the monitored system condition(s) or parameter(s) do not deviate from the non-error condition at block 504, then the error condition detector 212 determines that an error condition is not detected (block 506). The process 500 then returns to block 406 of FIG. 4.

If the monitored system condition(s) or parameter(s) deviate from the non-error condition at block 504, then the error condition detector 212 determines that an error condition is detected (block 508). The process 500 then returns to block 406 of FIG. 4.

Figure 6:
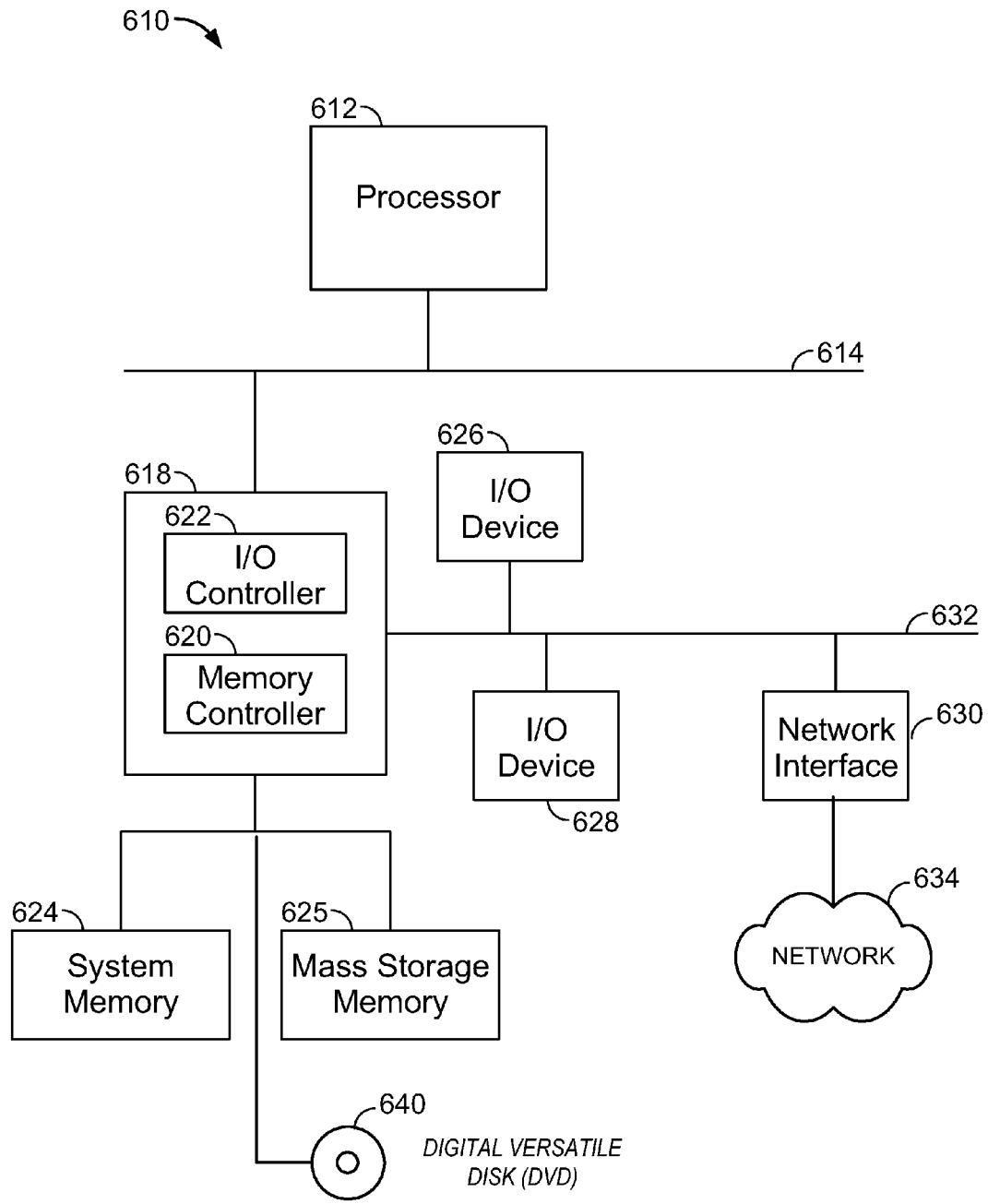
FIG. 6 is a block diagram of an example processor system that may be used to implement the example methods and apparatus described herein.

FIG. 6 is a block diagram of an example processor system that may be used to implement the example methods and apparatus described herein. The processor system 610 of FIG. 6 includes a processor 612 that is coupled to an interconnection bus 614. The processor 612 may be any suitable processor, processing unit, or microprocessor (e.g., one or more Intel® microprocessors from the Pentium® family, the Itanium® family or the XScale® family, Texas Instruments® embedded processors, and/or other processors from other families). The system 610 may be a multi-processor system and, thus, may include one or more additional processors that are identical or similar to the processor 612 and that are communicatively coupled to the interconnection bus 614.

The processor 612 of FIG. 6 is coupled to a chipset 618, which includes a memory controller 620 and an input/output (I/O) controller 622. A chipset provides I/O and memory management functions as well as a plurality of general purpose and/or special purpose registers, timers, etc. that are accessible or used by one or more processors coupled to the chipset 618. The memory controller 620 performs functions that enable the processor 612 to access a system memory 624 and a mass storage memory 625, and/or a digital versatile disk (DVD) 640.

In general, the system memory 624 may include any desired type of volatile and/or non-volatile memory (NVM) such as, for example, static random access memory (SRAM), dynamic random access memory (DRAM), flash memory (FRAM), read-only memory (ROM), etc. The mass storage memory 625 may include any desired type of mass storage device including hard disk drives, optical drives, tape storage devices, etc. The machine readable instructions of FIGS. 4 and 5 may be stored in the system memory 624, the mass storage memory 625, and/or the DVD 640.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, pushbuttons, a video or other local user interface display or monitor, a mouse, etc. The network interface 630 may be, for example, an Ethernet device, an asynchronous transfer mode (ATM) device, an 802.11 device, a DSL modem, a cable modem, a cellular modem, HART communicating process control system, any fieldbus communication systems similar to Foundation Fieldbus and Profibus, etc. that enables the processor system 610 to communicate with another processor system. The example network interface 630 of FIG. 6 is also communicatively coupled to a network 634, such as an intranet, a Local Area Network, a Wide Area Network, the Internet, etc.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Figure 7:
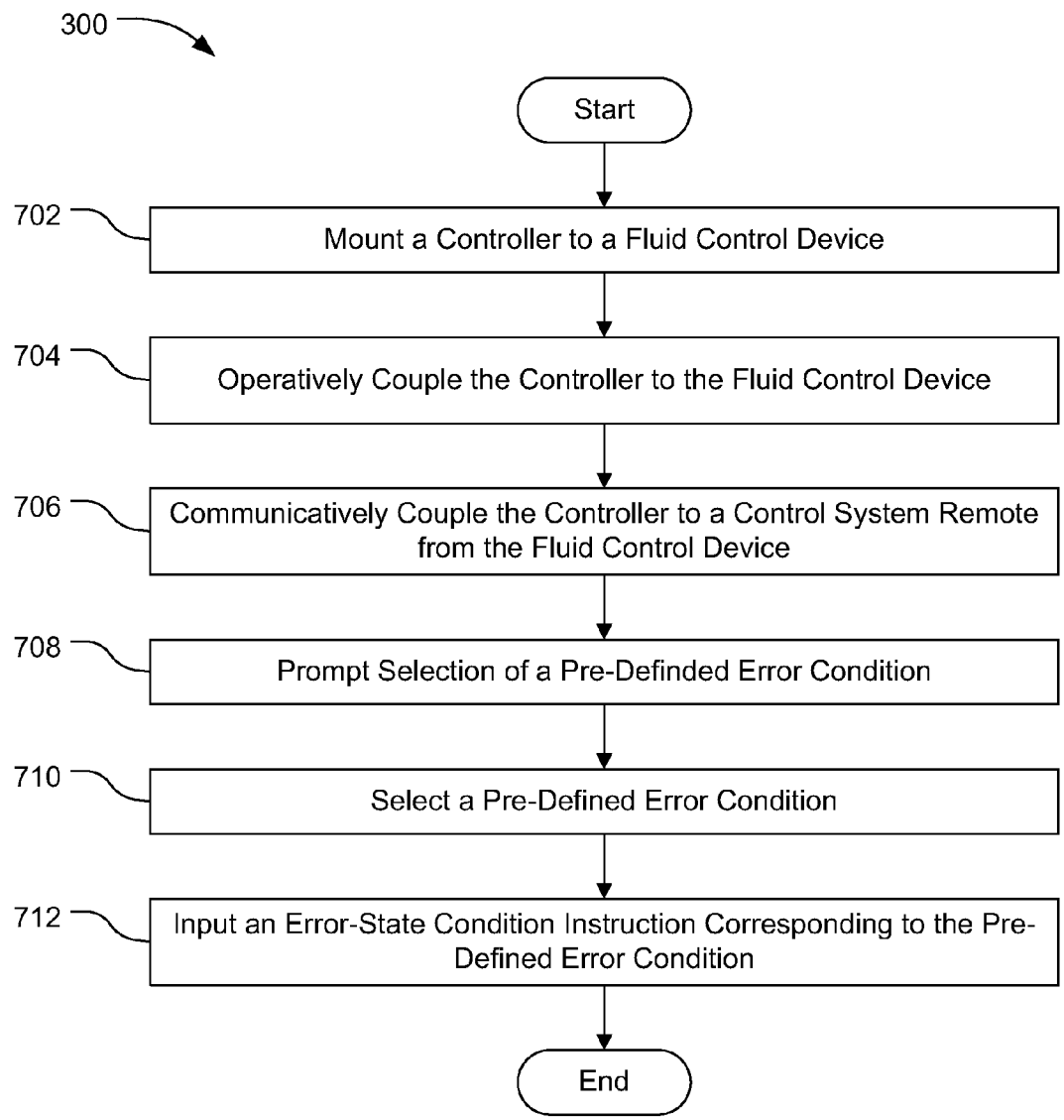
FIG. 7 is a flowchart representative of an example method of installing the controller apparatus described in FIG. 1.

FIG. 7 is a flowchart representative of an example method of installing the controller apparatus 102 described in FIG. 1. To install the controller apparatus 102, the controller apparatus is mounted to a field device (e.g., the actuator 132 of the field device 112) and/or may be coupled proximate to the field device via a mounting or bracket (block 702). The controller apparatus 102 is then operatively coupled to the field device 112 (block 704). For example, the passageways 144a and 144b are coupled to the field device control module 208 and the actuator 132. Additionally, the controller apparatus 102 is operatively coupled and/or configured to communication the control system 122 and/or other field devices (e.g., the field devices 108 and 118) via the communication network 106 (block 706).

In some examples, the controller apparatus may prompt for selection of the pre-defined error conditions (block 708). For example, the pre-defined error conditions may be selected from a drop down menu presented to a user or technician via the input interface and/or the pre-defined error conditions may be programmed in the controller apparatus 102 via, for example, a computer.

The pre-defined error conditions are then provided or configured (block 710). In some examples, the pre-defined error conditions may be factory installed and/or may be configured in the field. Once the error conditions are provided or configured, the pre-defined error-state instructions corresponding to each of the selected or defined pre-determined error conditions are provided or configured (block 712). As noted above, such pre-defined error-state instructions may be programmable, user defined, and/or customized per a user's requirements.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A non-transitory computer-readable medium comprising instructions that, when executed, cause a machine to:
   analyze, via a controller coupled to a field control device, a communication from a control system remotely located from the controller, the control system to operate the field control device during a non-error condition;
   detect an error condition while the field control device is communicatively coupled to and receives the communication from the control system; and
   override the communication between the control system and the controller to operate the field control device based on a pre-defined error-state instruction stored in the controller when the error condition is detected to cause the field control device to move to a first position for a first amount of time and subsequently move the field control device to a second position for a second amount of time, the first position being different than the second position.

2. The non-transitory computer-readable medium as defined in claim 1 comprising instructions that, when executed, cause the machine to detect the error condition by monitoring a process parameter of the field control device via the controller.

3. The non-transitory computer-readable medium as defined in claim 1 comprising instructions that, when executed, cause the machine to move the field control device to the first position or the second position by moving the field control device to a fully open position or a fully closed position.

4. The non-transitory computer-readable medium as defined in claim 1 comprising instructions that, when executed, cause the machine to move the field control device to the first position by moving the field control device to a first intermediate position, and move the field control device to the second position by moving the field control device to a second intermediate position, wherein the first intermediate position or the second intermediate position is between a fully open position and a fully closed position.

5. A non-transitory computer-readable medium comprising instructions that, when executed, cause a machine to:
   operate a field control device via a control signal that is broadcasted over a network by a process control system;
   monitor an operating parameter of the process control system;
   detect an error condition based on the operating parameter; and
   override the control signal to control the field control device via a local controller operatively coupled to the field control device based on at least one pre-determined error-state instruction stored in the local controller when the error condition is detected and the control signal is received by the field control device.

6. The non-transitory computer-readable medium as defined in claim 5 comprising instructions that, when executed, cause the machine to monitor the operating parameter by determining if a temperature surrounding the controller is greater than a threshold value.

7. The non-transitory computer-readable medium as defined in claim 5 comprising instructions that, when executed, cause the machine to monitor the operating parameter by:
   providing a command position value to the controller to move the field control device to a desired operating position;
   receiving a measured position value representative of an actual position of the field control device; and
   comparing the measured position value and the command position value.

8. The non-transitory computer-readable medium as defined in claim 7 comprising instructions that, when executed, cause the machine to operate the field control device based on the pre-determined error-state instruction when a difference between the measured position value and the command position value is greater than a threshold value.

9. The non-transitory computer-readable medium as defined in claim 5 comprising instructions that, when executed, cause the machine to monitor the operating parameter by:
   receiving a measured position value representative of an actual position of the field control device from a position sensor of the field control device; and
   comparing the measured position value received and a pre-set calibration range.

10. The non-transitory computer-readable medium as defined in claim 9 comprising instructions that, when executed, cause the machine to operate the field control device by calibrating the field control device if the measured position value received is outside of the pre-set calibration range.

11. The non-transitory computer-readable medium as defined in claim 5 comprising instructions that, when executed, cause the machine to obtain information relating to an operation of another field control device that precedes an operation of the field control device.

12. The non-transitory computer-readable medium as defined in claim 11 comprising instructions that, when executed, cause the machine to override the control signal to control the field control device based on the pre-determined error-state instruction by delaying the control signal provided by the control system when the other field control device is not in a proper position.

13. The non-transitory computer-readable medium as defined in claim 5 comprising instructions that, when executed, cause the machine to select or define the pre-determined error-state instruction via a user interface.

14. The non-transitory computer-readable medium as defined in claim 5 comprising instructions that, when executed, cause the machine to monitor the operating parameter of the process system by monitoring at least one of a communication connection, a temperature surrounding the local controller, a calibration parameter, or a position parameter.

15. The non-transitory computer-readable medium as defined in claim 5 comprising instructions that, when executed, cause the machine to control the field control device by causing a fluid valve to move to a closed position via the local controller when the error condition is detected when the fluid control device is implemented as the fluid valve.

16. The non-transitory computer-readable medium as defined in claim 5 comprising instructions that, when executed, cause the machine to enable the process control system to operate the field control device in a non-error condition when the detected error condition is resolved.

17. The non-transitory computer-readable medium as defined in claim 5 comprising instructions that, when executed, cause the machine to operate the field control device based on the pre-determined error state instruction stored in the local controller by processing partial instructions provided by the process control system.

18. The non-transitory computer-readable medium as defined in claim 5 comprising instructions that, when executed, cause the machine to communicatively couple the local controller to the process control system via wireless communication.

19. The non-transitory computer-readable medium as defined in claim 5 comprising instructions that, when executed, cause the machine to broadcast an alert, via the local controller, when the field control device is improperly positioned or requires maintenance.

20. The non-transitory computer-readable medium as defined in claim 5 comprising instructions that, when executed, cause the machine to override the control signal to control the field control device based on the at least one pre-determined error-state instruction by moving the field control device to an intermediate position between a fully open position and a fully closed position.

21. The non-transitory computer-readable medium as defined in claim 5 comprising instructions that, when executed, cause the machine to operate, via the local controller, the field control device via the control signal provided from the control system remotely located from the local controller during a non-error condition.

22. The non-transitory computer-readable medium as defined in claim 5 comprising instructions that, when executed, cause the machine to detect the error condition while the field control device is communicatively coupled to and receives the control signal from the process control system.

23. A non-transitory computer-readable medium comprising instructions that, when executed, cause a machine to:
analyze a command from a control system remotely located from a local controller coupled to a field control device;
control a position of the field device based on the command from the control system during a non-error condition;
detect an error-condition; and
override the command from the control system and instruct the field device based on a pre-defined error-state setting stored in the local controller when the error condition is detected regardless of the controller receiving the command from the control system.

24. The non-transitory computer-readable medium as defined in claim 23 comprising instructions that, when executed, cause the machine to detect the error-condition by determining a temperature surrounding the controller greater than a threshold value.

25. The non-transitory computer-readable medium as defined in claim 23 comprising instructions that, when executed, cause the machine to detect the error-condition by determining a position value of the field control device provided by a position sensor of the field control device and determining if the position value corresponds to a command position value provided by the control system or the local controller.

26. The non-transitory computer-readable medium as defined in claim 23 comprising instructions that, when executed, cause the machine to present a prompt requesting the pre-defined error-state setting and receive the pre-defined error-state setting via an input device.

27. The non-transitory computer-readable medium as defined in claim 23 comprising instructions that, when executed, cause the machine to command the field device via the command provided by the control system when the detected error condition is resolved.

* * * * *